(12) United States Patent
Meyer et al.

(10) Patent No.: US 10,903,647 B2
(45) Date of Patent: *Jan. 26, 2021

(54) SURGE PROTECTION DEVICE

(71) Applicant: Phoenix Contact GmbH & Co. KG, Blomberg (DE)

(72) Inventors: Thomas Meyer, Ottenstein (DE); Hannes Sagebiel, Hameln (DE); Karsten Trachte, Lemgo (DE)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/530,643

(22) Filed: Aug. 2, 2019

(65) Prior Publication Data
US 2020/0044442 A1    Feb. 6, 2020

(30) Foreign Application Priority Data
Aug. 3, 2018    (DE) ........................ 10 2018 118 906

(51) Int. Cl.
| H02H 9/06 | (2006.01) |
| H01R 4/38 | (2006.01) |
| H01T 4/06 | (2006.01) |
| F16B 2/12 | (2006.01) |
| H01T 4/02 | (2006.01) |
| H01T 4/04 | (2006.01) |

(Continued)

(52) U.S. Cl.
CPC ................. *H02H 9/06* (2013.01); *H01R 4/38* (2013.01); *F16B 2/12* (2013.01); *H01T 4/02* (2013.01); *H01T 4/04* (2013.01); *H01T 4/06* (2013.01); *H01T 4/16* (2013.01); *H01T 4/18* (2013.01); *H01T 4/20* (2013.01)

(58) Field of Classification Search
CPC .... H02H 9/06; H01R 4/38; H01T 4/00; H01T 4/06; H01T 4/16; H01T 4/20; H01T 2/02
See application file for complete search history.

(56) References Cited

U.S. PATENT DOCUMENTS

| 3,665,255 A | * | 5/1972 | Jakszt ....................... H01T 4/20 361/128 |
| 4,320,436 A |   | 3/1982 | Bushnell |

(Continued)

FOREIGN PATENT DOCUMENTS

| DE | 202013102647 U1 | 6/2013 |
| DE | 102013113614 A1 | 6/2015 |

(Continued)

*Primary Examiner* — Rexford N Barnie
*Assistant Examiner* — Kalu Kelly Emeaba
(74) *Attorney, Agent, or Firm* — David S. Safran; Roberts Calderon Safran & Cole, P.C.

(57) ABSTRACT

A surge protection device with stack spark gaps, whereby a stack spark gap is formed from multiple electrodes and insulating elements that are arranged between the electrodes, with an ignition switch for influencing the ignition behavior of the stack spark gaps, with a first electrically conductive clamping element and with a second electrically conductive clamping element, whereby the clamping elements are arranged on opposite sides of the stack spark gaps, with at least one connecting element by which the clamping elements are connected to one another, and with connection elements for electrical connection of the stack spark gaps.

13 Claims, 8 Drawing Sheets

(51) Int. Cl.
*H01T 4/18* (2006.01)
*H01T 4/16* (2006.01)
*H01T 4/20* (2006.01)

(56) References Cited

U.S. PATENT DOCUMENTS

| | | | | |
|---|---|---|---|---|
| 4,645,941 | A * | 2/1987 | Nicolas | H03K 3/537 |
| | | | | 307/110 |
| 5,480,743 | A | 1/1996 | McCarter et al. | |
| 10,263,229 | B2 | 4/2019 | Motokawa et al. | |
| 2002/0048131 | A1* | 4/2002 | Jakwani | H01T 4/06 |
| | | | | 361/118 |
| 2004/0033707 | A1* | 2/2004 | Ma | G01R 1/0433 |
| | | | | 439/71 |
| 2004/0160723 | A1 | 8/2004 | Wittmann et al. | |
| 2008/0204963 | A1* | 8/2008 | Baker | H01T 4/06 |
| | | | | 361/120 |
| 2011/0019348 | A1* | 1/2011 | Kludt | H05K 5/0017 |
| | | | | 361/679.01 |
| 2012/0067836 | A1* | 3/2012 | MacKay | B63B 17/00 |
| | | | | 211/119.003 |
| 2013/0182381 | A1* | 7/2013 | Gray | A61M 5/1415 |
| | | | | 361/679.01 |
| 2013/0270408 | A1* | 10/2013 | Schatzl | G03B 17/566 |
| | | | | 248/229.2 |
| 2013/0316567 | A1* | 11/2013 | Sasano | H01R 9/2491 |
| | | | | 439/431 |
| 2014/0204497 | A1* | 7/2014 | Martinez Sanchez | |
| | | | | H05K 7/186 |
| | | | | 361/119 |
| 2014/0313631 | A1* | 10/2014 | Mickievicz | H05K 5/0286 |
| | | | | 361/118 |
| 2015/0008108 | A1* | 1/2015 | Wu | H01H 19/64 |
| | | | | 200/293 |
| 2015/0126052 | A1* | 5/2015 | Yamkovoy | H01R 13/652 |
| | | | | 439/92 |
| 2015/0349523 | A1 | 12/2015 | Tsovilis et al. | |
| 2015/0362964 | A1* | 12/2015 | Correll | G06F 1/26 |
| | | | | 361/679.4 |
| 2016/0035529 | A1* | 2/2016 | Durth | H01C 7/10 |
| | | | | 337/18 |
| 2016/0141858 | A1* | 5/2016 | Hoffmann | H02H 9/06 |
| | | | | 361/118 |
| 2016/0276821 | A1 | 9/2016 | Politis et al. | |
| 2017/0077678 | A1* | 3/2017 | Dorsch | H01T 1/20 |
| 2017/0084368 | A1* | 3/2017 | Johansson | H01C 7/12 |
| 2017/0117700 | A1* | 4/2017 | Idota | H01R 31/06 |
| 2017/0271785 | A1* | 9/2017 | Do | H01R 4/38 |
| 2017/0301489 | A1* | 10/2017 | Palvadi | H02H 7/222 |
| 2017/0310023 | A1* | 10/2017 | Trombley | H01R 4/46 |
| 2017/0366000 | A1* | 12/2017 | Igl | H01T 4/06 |
| 2018/0068767 | A1* | 3/2018 | Bockarev | H01B 17/14 |
| 2020/0044419 | A1* | 2/2020 | Meyer | H01T 4/16 |
| 2020/0044420 | A1 | 2/2020 | Meyer et al. | |
| 2020/0044442 | A1 | 2/2020 | Meyer et al. | |
| 2020/0059089 | A1* | 2/2020 | Li | H02H 9/043 |
| 2020/0127443 | A1* | 4/2020 | Dorsch | H01T 4/10 |
| 2020/0185887 | A1* | 6/2020 | Klinger | H01T 4/02 |
| 2020/0185912 | A1* | 6/2020 | Schork | H02H 9/04 |
| 2020/0279712 | A1* | 9/2020 | He | H01J 17/16 |
| 2020/0318674 | A1* | 10/2020 | Axelsson | F16B 2/12 |
| 2020/0328578 | A1* | 10/2020 | Mayuzumi | H02H 9/06 |

FOREIGN PATENT DOCUMENTS

| | | |
|---|---|---|
| DE | 202014101167 U1 | 6/2015 |
| WO | 2016169841 A1 | 10/2016 |
| WO | 2017080825 A1 | 5/2017 |

* cited by examiner

SURGE PROTECTION DEVICE

BACKGROUND OF THE INVENTION

Field of the Invention

The invention relates to a surge protection device with stack spark gaps, whereby a stack spark gap is formed from multiple electrodes and insulating elements that are arranged between the electrodes, with an ignition switch for influencing the ignition behavior of the stack spark gaps, with a first electrically conductive clamping element and with a second electrically conductive clamping element, whereby the clamping elements are arranged opposite to the front sides of the stack spark gaps, with a connecting element, by which the clamping elements are connected to one another, and with connection elements for electrical connection of the stack spark gaps.

Description of the Related Art

Surge protection devices are known in a wide variety of designs from the state of the art and are used for protecting electrical devices or lines against surges, which can be caused by, for example, lightning strikes or defects in technical systems. To divert surges that arise, surge protection devices have surge diverters. In the case of the surge protection devices in question, stack spark gaps provide the surge diverter, which when a threshold voltage is exceeded—in equipment protection, generally a voltage above the operational voltage of a connected device but below the insulation strength with regard to surge voltages of this device—becomes conductive in fractions of a second and thus diverts the surge that is triggered.

The stack spark gaps consist of multiple electrodes and multiple insulators, which are arranged between the individual electrodes, so that in each case, an insulator is located between two electrodes. Usually, the insulator has an opening in the middle; in any case, two electrodes form a (partial) spark gap. This basic electrode arrangement is repeated one behind another in multiple places in the stack spark gaps, so that the stack spark gap comprises multiple partial spark gaps. The electrodes in most cases are designed as graphite disks; the insulators are often produced as insulating films made of plastic.

From the state of the art, it is known to connect multiple stack spark gaps to one another in the form of a star circuit—in the case of three stack spark gaps, also called a Y-connection. The stack spark gaps are then connected to one another, so that all stack spark gaps are interconnected in each case with a connection, namely in the star point, whereby the respective other connection of any stack spark gap uses an external connection. Then consequently, two stack spark gaps are always connected in series between two external connections. Such arrangements are used, for example, for the protection of direct voltage systems, in particular for the protection of photovoltaic units.

The above-mentioned ignition switch is used for influencing the ignition behavior of the stack spark gaps, for example to set the voltage distribution via the partial spark gaps that are connected one behind another. As a result, the triggering behavior of the partial spark gaps can be influenced specifically. It is known, for example, to connect adjacent electrodes to passive electrical components for this purpose. The precise electrical connection of the electrodes to the individual stack spark gaps by the ignition switch is not attained, however.

In a surge protection device that is known to the applicant from experience, the stack spark gaps are embedded in a plastic housing and are connected to one another via metal plates, which are guided crosswise by guides in the plastic housing. It is disadvantageous in the known arrangement that tensile forces that arise in the case of overvoltage have to be taken up by the housing, which results in twisting. Moreover, the number of individual electrodes of a stack spark gap is limited by the size of the recesses in the plastic housing, in which the stack spark gaps are accommodated.

SUMMARY OF THE INVENTION

The object of the invention is to provide a surge protection device which, in addition to a compact, stable and user-friendly construction, ensures high flexibility relative to the number of electrodes of a stack spark gap.

In the case of the surge protection device according to the invention, the object is—starting from the above-described surge protection device—achieved by the features described herein. The surge protection device according to the invention has three stack spark gaps, which are arranged beside one another between the two clamping elements. In this case, the stack spark gaps are preferably also oriented parallel to one another. In addition, the at least one connecting element is electrically conductive. As a result of both the connecting element and the clamping elements that are connected to one another by the connecting element being electrically conductive, the two clamping elements are electrically connected to one another via the connecting element.

Each of the stack spark gaps is connected, on a front side that is used as a connection side, in an electrically conductive manner to a respective connection element. Moreover, between the connection side of any stack spark gap and the clamping element that is arranged on the connection side, an insulator is arranged, so that the connection side of the stack spark gap is insulated electrically from the associated, i.e., the adjacent, clamping element. The front side of any stack spark gap that is opposite to the connection side is connected in an electrically conductive manner to the clamping element that is arranged on this front side. Each stack spark gap is thus connected in an electrically conductive manner to a clamping element and is arranged in an electrically insulated manner in the respective other clamping element, so that the three stack spark gaps altogether form a star circuit. In the arrangement according to the invention, the middle potential—the star point—is thus formed by the two clamping elements and the at least one connecting element.

The ignition switch of the surge protection device according to the invention can be plugged into at least one of the clamping elements, so that the ignition switch is held in a defined manner opposite to the clamping element and thus also to the stack spark gaps. In this way, the ignition switch according to the invention achieves advantages when joining together the ignition switch on the one side and the clamping elements with the connecting element and stack spark gaps held thereon on the other side. The defined holding and positioning of the ignition switch with and opposite to the clamping element is also advantageous with respect to additional electrical contact, which is produced by plugging the ignition switch into the clamping element and is produced in the plugged-in state.

In a preferred configuration, the ignition switch can be plugged into two clamping elements. Preferably, the ignition switch is made in the form of a plate, which is equipped with the necessary electrical and/or electronic components. Then, it is readily conceivable that for plugging together the ignition switch and clamping element, accordingly corresponding holders and mating holders are produced on or with the plate of the ignition switch and the clamping element. In one configuration, a projection is made on the clamping element, which projection extends into a recess in the plate of the ignition switch when the ignition switch is plugged in.

The surge protection device according to the invention combines multiple advantages because of its configuration. On the one hand, as a result of the individual stack spark gaps being clamped between the clamping elements, the number of electrodes per stack spark gap can be selected arbitrarily. Only the connecting element has to be matched to the longitudinal extension of the stack spark gaps. On the other hand, the surge protection device according to the invention offers an elegant solution for ensuring contact between the stack spark gap and a star circuit in the compact space. In the case of overvoltage, tensile forces that develop are taken up by the clamping elements and the connecting elements. Since, in addition, it is provided according to the invention that the ignition switch is plugged into at least one clamping element, the ignition switch is held in a defined manner in the stack spark gaps, providing an ideal basis for ensuring a precise contact of the stack spark gaps.

In a preferred configuration of the surge protection device, it is provided that in the plugged-in state, the ignition switch also makes electrical contact with the at least one clamping element. Thus, the ignition switch also makes available the electrical star or middle potential of the stack spark gaps, should this be necessary in terms of circuit engineering.

In an especially preferred configuration of the surge protection device according to the invention, the ignition switch in the plugged-in state is contacted via at least one contact with at least one electrode. The contact is advantageously produced by a spring contact, by which the contact is simplified.

In order to make controlled routing of the individual spark gaps of a stack spark gap possible, it is provided in an especially preferred configuration that each electrode of a stack spark gap—with the exception of the first electrode on each connection side of a stack spark gap—is contacted by the ignition switch. Thus, the ignition switch can electrically influence virtually any electrode, should this be necessary in terms of circuit engineering.

The ignition switch preferably comprises capacitors. In each case, a capacitor is then connected with a terminal to an electrode of the stack spark gap—again with the exception of the first electrode to the connection side of the stack spark gap. The other terminals of the capacitors of a stack spark gap are connected to one another in an electrically conductive manner.

As already explained, the ignition switch according to the invention is plugged into at least one clamping element. To this end, in a configuration of the surge protection device according to the invention, a plug is made on at least one clamping element, and, moreover, a corresponding recess is made on the ignition switch. The plug extends into the recess in the ignition switch, when the ignition switch is plugged in. If the ignition switch is plugged into both clamping elements, plugs are made on both clamping elements.

In a further development, projections are made on the plugs, which in the plugged-in state of the ignition switch extend above the edges of the recesses on the side of the ignition switch that faces away from the clamping elements. In this way, the ignition switch is held firmly in a position by which a reliable contact can be ensured. In particular, when the contacts are designed as spring contacts, it should be ensured that the ignition switch has very little or no play on the clamping elements, so that the contact is not interrupted by a movement of the ignition switch.

An especially preferred further development of the surge protection device according to the invention deals with the production of stack spark gaps. As explained above, a stack spark gap is formed by a certain number of electrodes, whereby an insulating element is arranged between two adjacent electrodes. According to the invention, for producing the stack spark gap, it is provided that the electrodes of the stack spark gap are arranged in holding frames that can be stacked flat one on top of another. To accommodate the electrodes, recesses are made in the holding frames, whereby in each case, an electrode is arranged in a recess. The outside contours of the recesses are preferably thus matched to the outside contour of the electrodes. It is especially on the holding frame according to the invention that electrodes from various stack spark gaps are arranged beside one another in a holding frame. Since three stack spark gaps are arranged in the surge protection device according to the invention, three electrodes are thus arranged beside one another in a holding frame, whereby each electrode is part of another stack spark gap. In order to produce a specific number of electrodes per stack spark gap, a number of holding frames that correspond to the number of electrodes per stack spark gap are stacked one on top of another. The insulating elements are preferably produced by an insulating film, which is placed on the electrodes of a holding frame, before the next holding frame is stacked. Because of this configuration, the number of electrodes per stack spark gap can vary in an especially simple way. In the case of this configuration, the stacked holding frames are then clamped between the clamping elements.

In order to be able to create the contact of the electrodes even in the case of the embodiment in which the electrodes are arranged in holding frames, a further development of the surge protection device is wherein in the individual holding frames, in each case a number of contact openings that correspond to the number of recesses are formed. In each case, a contact opening is connected to a recess, so that an electrode that is arranged in a recess can be contacted through the contact opening with the ignition switch, in particular with the contacts—spring contacts—of the ignition switch.

In another preferred configuration, it is provided that gripping surfaces are made on the front sides of the holding frame. In this way, on the one hand, the possibility of being able to securely grip individual holding frames is produced by which the stacking of the frames one on top of another is facilitated. On the other hand, multiple holding frames that are stacked one on top of another form a large gripping surface, which simplifies the positioning of the stacked holding frames between the clamping elements. Additional advantages of the production of gripping surfaces on the front sides of the holding frames arise in connection with embodiments of the surge protection device according to the invention that are further explained below.

Another configuration of the surge protection device according to the invention calls for the stack spark gaps to be arranged in a housing. According to the invention, the housing is designed to have multiple parts; it has namely a housing bottom and a housing cover. This configuration makes possible a simple arrangement of the stack spark gaps, in particular the stack spark gaps in the housing that are arranged and contacted between the clamping elements. In particular, the stack spark gaps are positioned in the housing bottom, then the ignition switch is plugged in, and then the housing cover is positioned for closing the housing. In an especially advantageous configuration, latching catches are made on the housing bottom. In the housing cover, corresponding latching recesses are then made, in which recesses the latching catches of the housing bottom engage, so that the housing cover is latched onto the housing bottom. More preferably, the latching catches and the latching recesses are made on the front sides of the housing.

If the electrodes are arranged in the holding frame, then the holding frames are preferably arranged in the housing in such a way that the longitudinal sides of the holding frames are arranged on the front sides. The front sides of the holding frames then point to the side surfaces of the housing. If the holding frames have gripping surfaces, a quite especially preferred configuration is wherein recesses are made on the side surfaces of the housing and in that the gripping surfaces of the holding frames are arranged in the recesses or extend into the recesses. The gripping surfaces of the holding frame thus form the gripping surfaces of the entire surge protection device, so that the latter can be easily gripped and mounted. Especially preferably, the recesses are formed by the interaction of the housing bottom and housing cover. More preferably, separate housing gripping surfaces are also made on the side surfaces of the housing bottom.

As mentioned above, the stack spark gaps are contacted by connection elements. Especially preferably, the connection elements have a contact area and a connection area. The contact area is in electrically conductive contact with the first electrode of a stack spark gap. The connection area is used to connect the surge protection device from outside. Especially preferably, the contact area is made flat in order to form a largest possible contact surface with the contacted electrodes. The connection area is, however, preferably made angular. More preferably, connection openings are made in the housing bottom. The connection areas of the connection elements are at least partially run out from the housing through these connection openings, so that as a whole, contacting of the surge protection device from the outside is made possible.

In general, there are a large number of possibilities for further developing and configuring the surge protection device according to the invention. To this end, reference is made to the description of preferred embodiments in conjunction with the accompanying drawings.

DETAILED DESCRIPTION OF THE INVENTION

In the figures, a surge protection device 1 or individual components of a surge protection device 1 is/are depicted as a whole. In the case of the surge protection device 1, the surge diverters are produced by stack spark gaps 2. The individual stack spark gaps 2 are comprised of multiple electrodes 3, between which respective insulating elements 4 are arranged.

Figure 1:
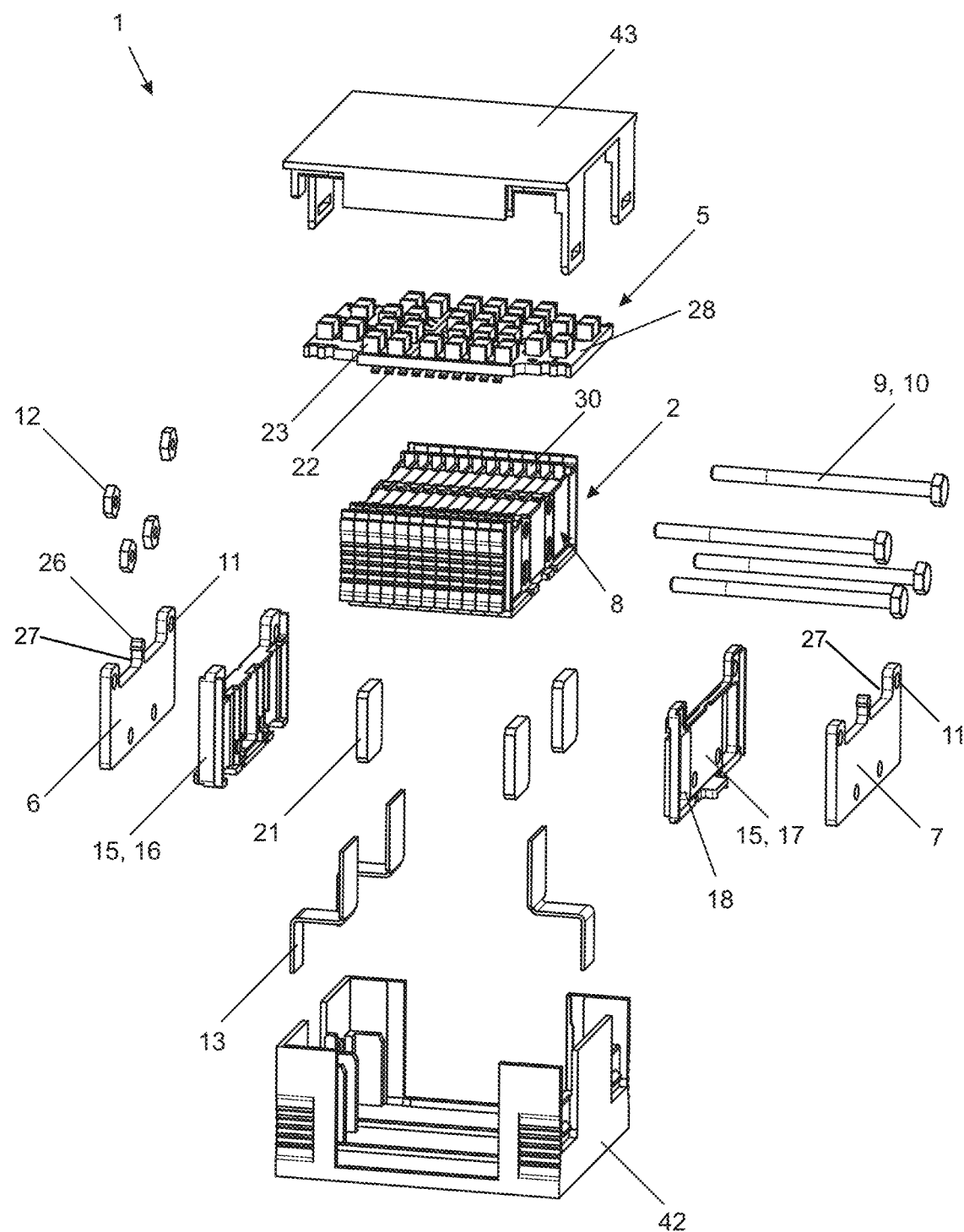
FIG. 1 shows an exploded view of a surge protection device.

FIG. 1 shows an exploded view of a surge protection device 1 with three stack spark gaps 2. In order to influence the ignition behavior of the stack spark gaps 2, the surge protection device 1 comprises an ignition switch 5. The stack spark gaps 2 are arranged between a first electrically conductive clamping element 6 and a second electrically conductive clamping element 7, whereby the two clamping elements 6, 7 are arranged opposite to one another on the front sides 8 of the stack spark gaps 2. The clamping elements 6, 7 are connected to one another by connecting elements 9, which are also electrically conductive. As a result of both the clamping elements 6, 7 and the connecting elements 9 being electrically conductive, the two clamping elements 6, 7 are connected electrically. In the depicted configuration, the individual connecting elements 9 are produced as screws 10, grip via recesses 11 formed in the clamping elements 6, 7, and are attached with screw nuts 12.

The individual stack spark gaps 2 are electrically connected via connection elements 13. To this end, the stack spark gaps 2 are in each case connected with a connection element 13 in an electrically conductive manner to a front side 8 that is used as a connection side 14.

As a whole, the surge protection device 1 is designed in such a way that an insulator 15 is arranged between the connection sides 14 of the stack spark gaps 2 and the clamping element 6, 7 that is arranged on the respective connection side 10. As a result, the connection sides 14 of the stack spark gaps 2 are electrically insulated from the corresponding clamping elements 6, 7.

The front side 8 of any stack spark gaps 2, opposite to the connection side 14, is connected in an electrically conductive manner to the clamping element 6, 7 that is arranged on this front side 8. Each individual stack spark gap 2 is thus connected in an electrically conductive manner to a clamping element 6, 7 and, moreover, arranged in an insulating manner relative to the other clamping element 6, 7. It is achieved by this configuration that the stack spark gaps 2 form a star circuit. The clamping elements 6, 7 and the connecting elements 9 thus carry the electrical middle potential in the operation of the surge protection device 1.

The two outer stack spark gaps 2 face the first clamping element 6 with their connection sides 14 and accordingly connect to the second clamping element 7 in an electrically conductive manner. The center stack spark gap 2 faces the second clamping element 7 with its connection side 14 and accordingly connects to the first clamping element 6 in an electrically conductive manner A preferred arrangement of the connection elements 13 is thus produced, since two connection elements 13 lie on one side of the surge protection device 1, and a connection element 13 lies in the center on the other side of the surge protection device 1.

Altogether, it is achieved by this configuration that there are always two stack spark gaps 2 between two connection elements 13 and thus two conductors, to which the surge protection device 1 is connected via the connection elements 14. In the case where the stack spark gaps 2 are conductive, the following current path is thus produced:

Via the connection element 14, through a stack spark gap 2, through the clamping element 6, 7, with which the stack spark gap 2 is connected in an electrically conductive manner, via the connecting elements 9, via the opposite clamping element 6, 7, through the stack spark gap 2 that is connected with this clamping element 6, 7 in an electrically conductive manner to the connection element 14 that is arranged on this stack spark gap 2.

Figure 2:
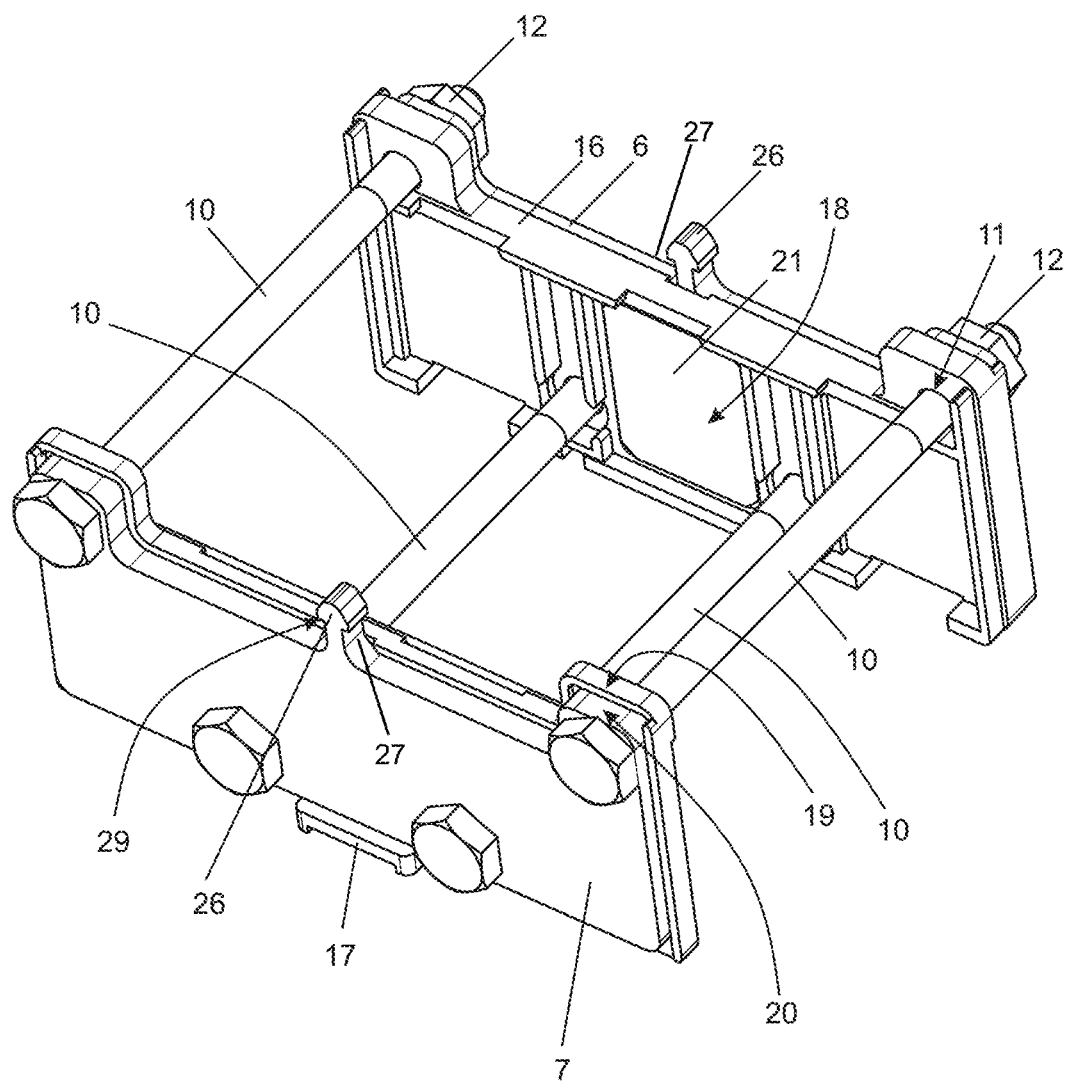
FIG. 2 shows a depiction of clamping elements connected to connecting elements.

FIG. 2 shows the first electrically conductive clamping element 6 and the second electrically conductive clamping element 7, which are connected to one another via four electrically conductive connecting elements 9, namely four screws 10, and form the star point of the star circuit. The screws 10 are guided from the outside of the second clamping element 7 through the recesses 11 to the outside of the first clamping element 6. The screw heads thus lie on the outside of the second clamping element 7, while the screws are attached by screw nuts 12 to the outside of the first clamping element 6. By using multiple connecting elements 9, the stability of the depicted design is increased.

The insulators 15, with which the connection sides 14 of the stack spark gaps 2 are electrically insulated against the clamping elements 6, 7, are made by insulating elements 16, 17. A first insulating element 16 is arranged on the side of the first clamping element 6 that faces the front sides 8 of the stack spark gaps 2. The insulating element 16 completely coats the clamping element 6 with the exception of a recess 18 that is formed in the center in the insulating element 16. By the recess 18, the front side 8 of the stack spark gaps 2 that are arranged in the center can be connected to the clamping element 6 in an electrically conductive manner, while the connection sides 14 of the two outer stack spark gaps 2 are electrically insulated from the clamping element 6 by the insulating element 16. On the side of the second clamping element 7 facing the front sides 8 of the stack spark gaps 2, a second insulating element 17 is arranged. The insulating element 17 has two recesses 18, which are formed in the insulating element 17 in such a way that the front sides 8 of the two outer stack spark gaps 2 can be connected in an electrically conductive manner to the second clamping element 7 by the recesses 18. To ensure better contact between the front sides 8 and the clamping elements 6, 7, contacting elements 21 are arranged between the front sides 8 and the clamping elements. The contacting elements 21 are sized in such a way that they can be inserted into the recesses 18. Moreover, the contacting elements 21 are matched essentially to the shape of the electrodes 3 in order to generate a largest possible contact surface between the electrodes 3 and the contacting elements 21.

The insulating elements 16, 17 are frame-shaped. The outside contour 19 of the insulating elements 16, 17 is matched to the outside contour 20 of the clamping elements 6, 7. Altogether, the insulating elements 16, 17 are designed in such a way, however, that they project somewhat beyond the clamping elements 6, 7 on the edges, so that a reliable insulation is ensured. Moreover, recesses 11 for creating the connecting elements 9 are also formed in the insulating elements 16, 17. In the assembled state, the recesses 11 in the clamping elements 6, 7 align with the recesses 11 in the insulating elements 16, 17.

The surge protection device 1 is designed in such a way that the ignition switch 5, which is produced here in the form of a plate that is equipped with electrical components, can be plugged into the clamping elements 6, 7. As a result, the ignition switch 5 is held in a defined manner opposite to the clamping elements 6, 7 and also opposite to the stack spark gaps 2. In the plugged-in state, the ignition switch 5 makes electrical contact, moreover, with the clamping elements 6, 7. In addition, in the plugged-in state, the ignition switch makes contact with at least one electrode 3 via at least one contact 22. The contacting of the electrodes 3 via the contacts 22 is especially easy to detect in FIG. 7.

Figure 3:
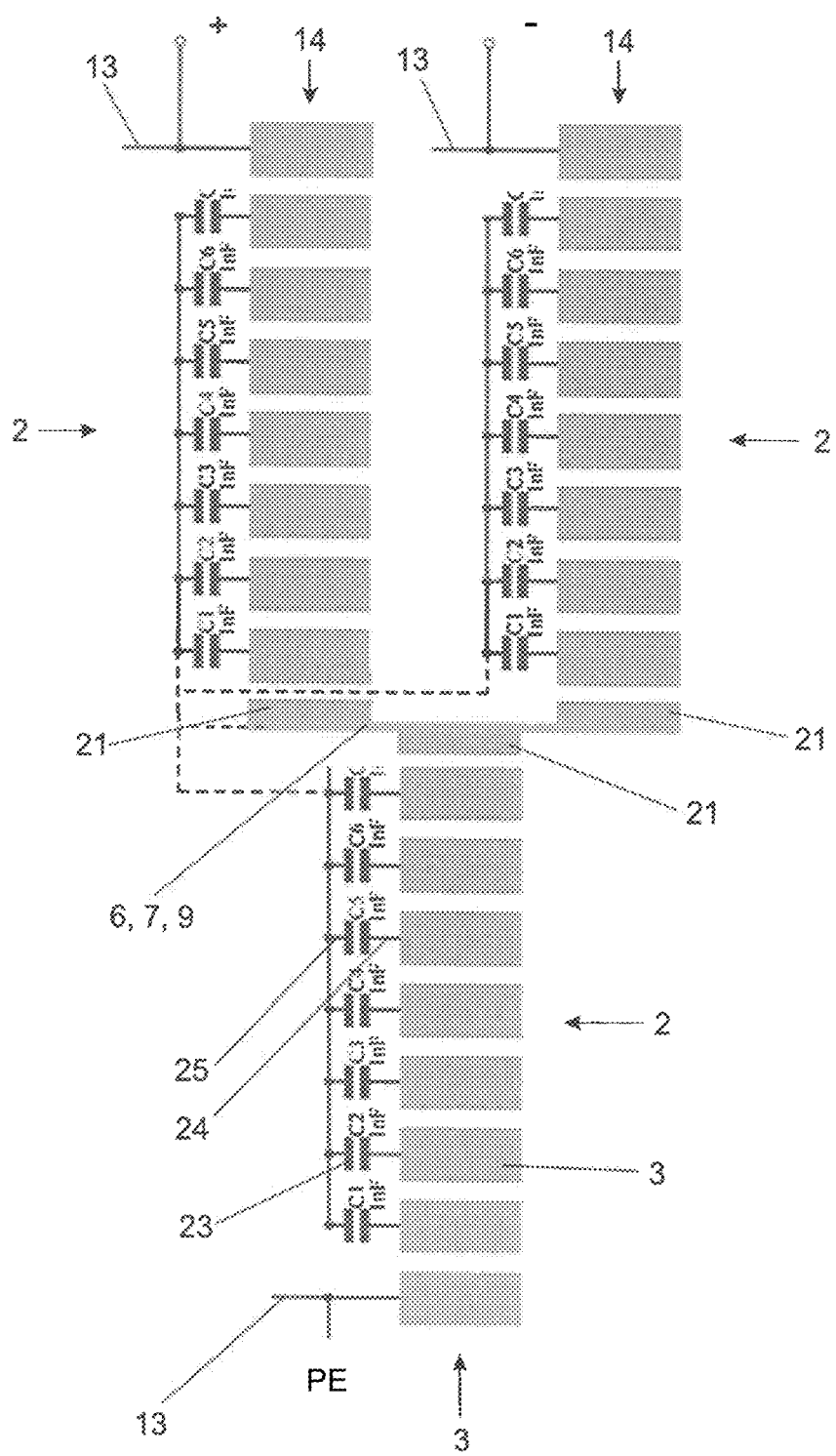
FIG. 3 shows a diagrammatic depiction of a connection of the stack spark gaps.

FIG. 3 depicts a schematic diagram, in which the contact between the ignition switch 5 and the electrodes 3 of the stack spark gaps 2 is evident. The ignition switch 5 has capacitors 23. In each case, a capacitor 23 is connected by a terminal 24 to an electrode 3. The other terminals 25 of the capacitors 23 of a stack spark gap 2 are connected to one another in a conductive manner. As a whole, all electrodes 3, except for the first electrode 3 on the connection side 14 of any stack spark gap 2, make contact with the capacitors 23.

Moreover, FIG. 3 readily depicts the star circuit of the stack spark gaps 2. The individual stack spark gaps 2 are connected via the contacting elements 21 to the middle potential, which in operation is carried by the clamping elements 6, 7 and the connecting elements 9; the connection is only depicted diagrammatically. Between a pair of + and – conductors, PE are in each case two stack spark gaps 2.

Figure 5:
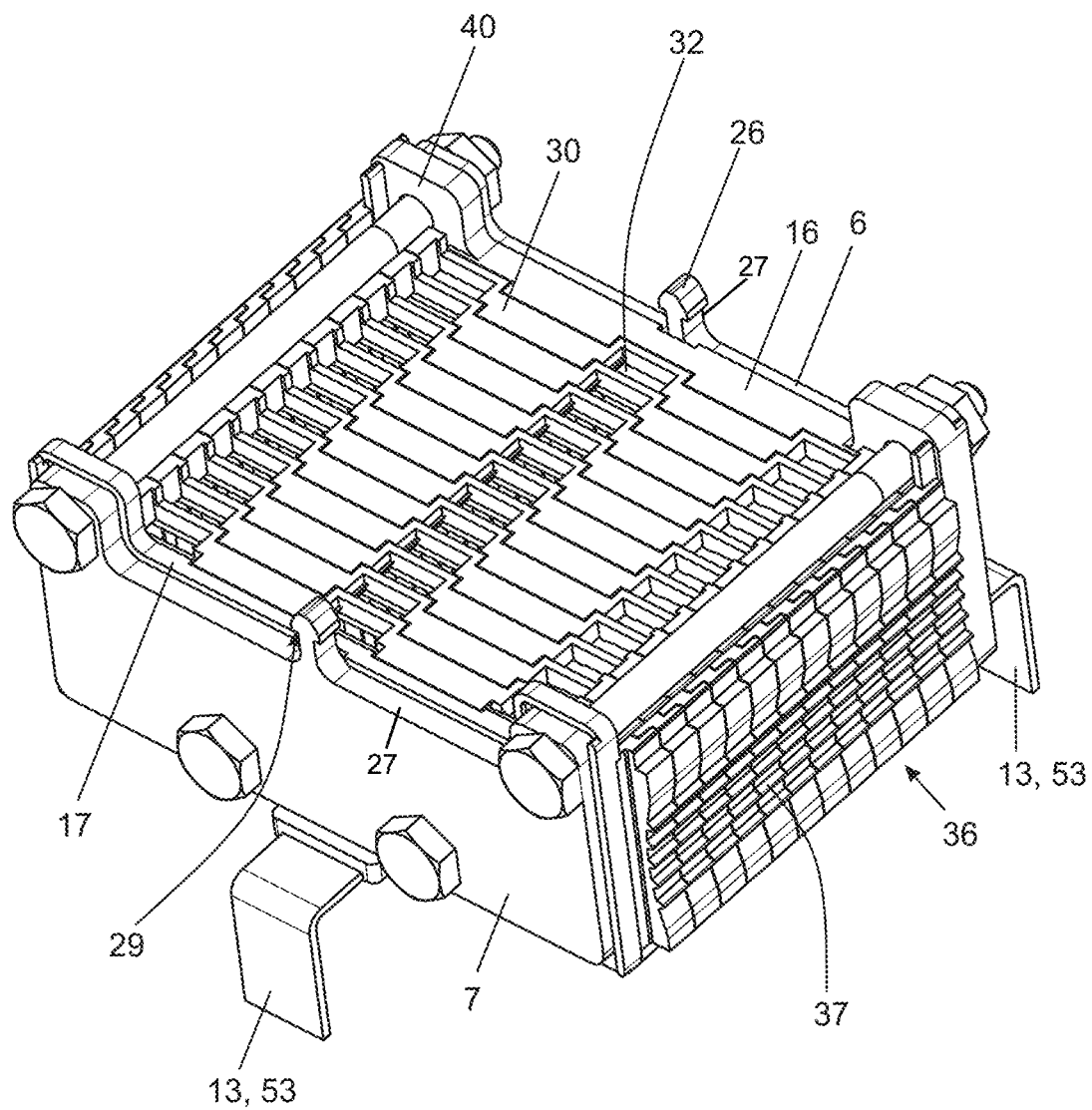
FIG. 5 shows the depiction from FIG. 2 with stack spark gaps.
Figure 6:
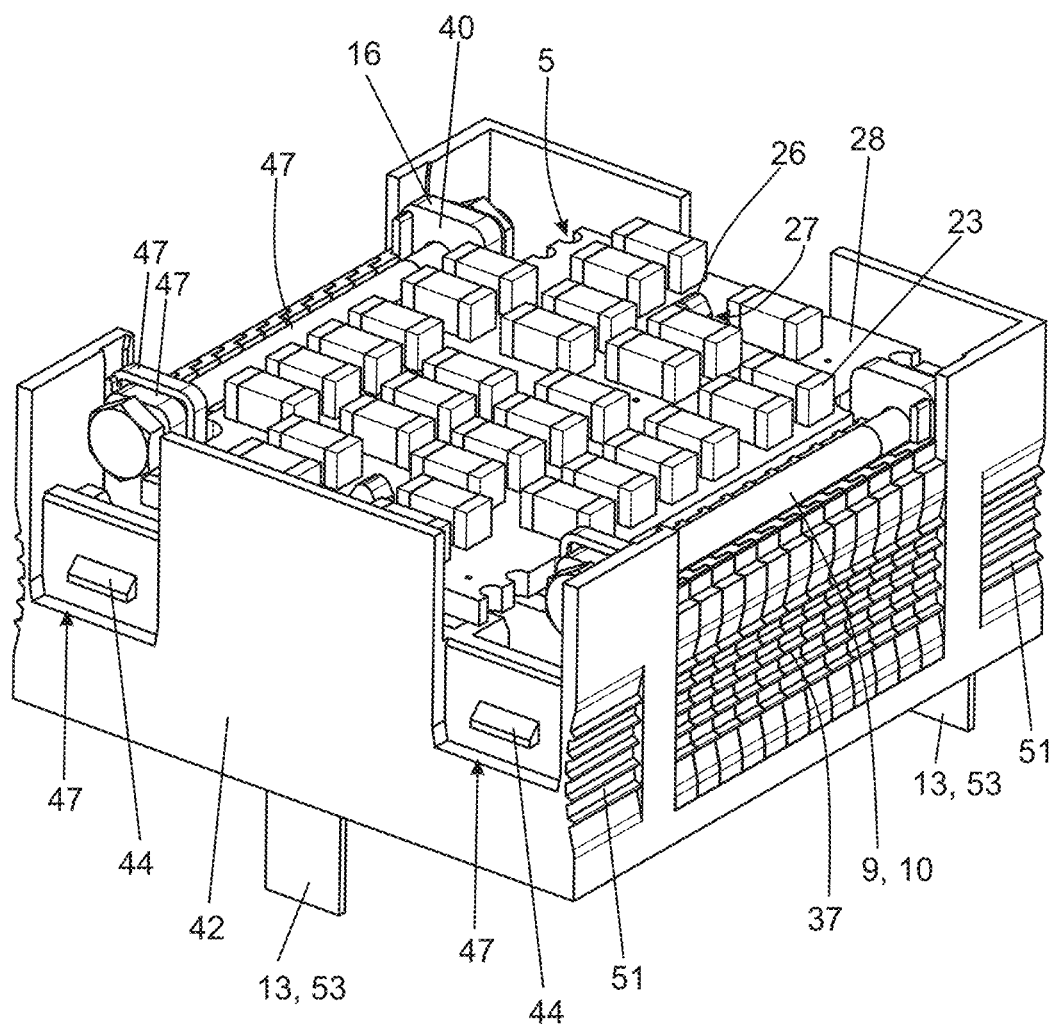
FIG. 6 shows the surge protection device from FIG. 1 with an open housing cover.

In order to be able to plug the ignition switch 5 into the clamping elements 6, 7, plugs 26 are made on the clamping elements 6, 7—as evident in FIGS. 1, 2, 5 and 6. Corresponding recesses 27, which extend into the plugs 26, are made in the ignition switch 5. In FIG. 6, the plugs 26 that extend through the recesses 27 are visible. The recesses 27 themselves cannot be seen directly because of the perspective view, but are identified by the reference number 27. If, as in the depicted example, the ignition switch 5 comprises a plate 28, the recesses 27 are preferably formed in the plate 28. In order to hold the ignition switch 5 firmly on the clamping elements 6, 7, projections 29 are made on the plugs 26. In the plugged-in state, which is depicted in FIG. 6, the projections 29 of the plugs 26 extend above the edges of the recesses 27 of the ignition switch 5 on the side of the ignition switch 5 that faces away from the clamping elements 6, 7.

Figure 4:
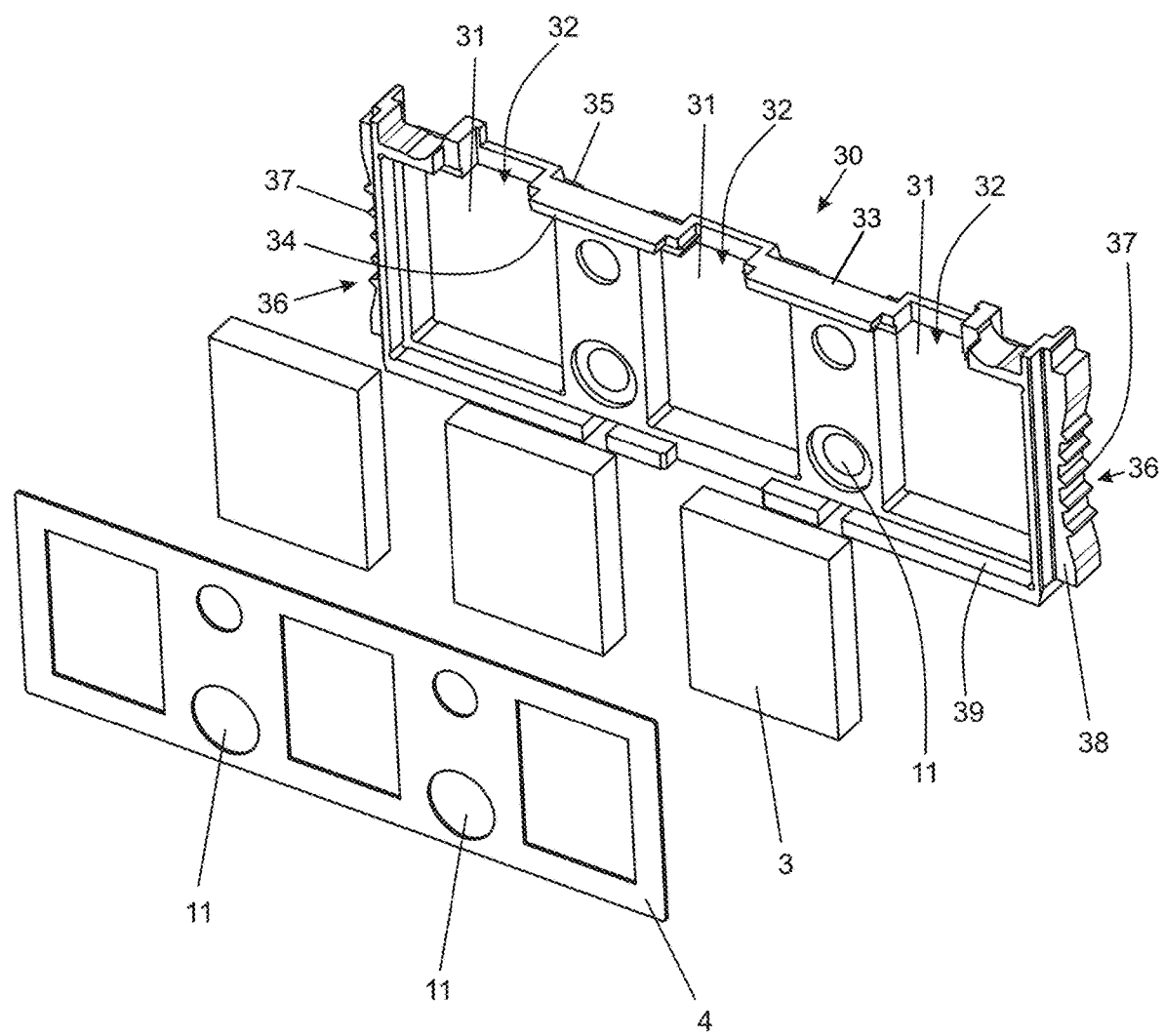
FIG. 4 shows a holding frame with electrodes and an insulating element.

A special characteristic of the depicted surge protection device 1 lies in how the individual stack spark gaps 2 are produced. A special feature lies in the fact that the individual electrodes 3 are arranged in holding frames 30 that can be stacked flat one on top of another. Such a holding frame 30 is depicted in FIG. 4. The holding frame 30 has three recesses 31, whereby an electrode 3 is positioned in each recess 31. Three electrodes 3 can thus be accommodated by the depicted holding frame 30. The three recesses 31 are in this case arranged beside one another in a plane and in each case have a contour that is matched to the outside dimensions of the individual electrodes 3. In this case, a holding frame 31 respectively accommodates an electrode 3 of a stack spark gap 2. By the stacking of the holding frames 30, altogether three stack spark gaps 2 are thus formed, whereby the number of electrodes 3 per stack spark gap 2 corresponds to the number of holding frames 30 that are stacked one on top of another—assuming that one electrode 3 is arranged in each recess 31. Each holding frame 30 has a number of contact openings 32 that correspond to the number of recesses 31, so that in the case of the depicted holding frame 30, in each case three contact openings 32 are made in the holding frame 30. In each case, a contact opening 32 is connected to a recess 31, i.e., the contact opening 32 connects directly to the recess 31, so that an electrode 3 that is arranged in a recess 31 can be contacted through the contact opening 32. Thus, the corresponding electrode 3 with the ignition switch 5 can be contacted through the contact opening 32. The contact openings 32 are in this case preferably made on a longitudinal side 33 of the holding frame 30, so that the contacting of the individual electrodes 3 can be done especially simply from this side. The projections 34 made on the holding frame 30 and the correspondingly designed set-backs are used in a simple fastening of holding frames 30 that are stacked one on top of another. During stacking, the projection 34 of a holding frame 30 extends above the set-back 35 of the holding frame 30 that is stacked on it.

For simpler handling of the holding frame 30, gripping surfaces 37 are made on the front side 36 of the holding frame 30. The gripping surfaces 37 are in this case preferably made on additional projections 38 that are made on the ends 36.

The holding frame 30 has a partially circumferential edge 39, relative to which the recesses 31 are set back. The edge 39 is in this case only partially circumferential, since it is interrupted at least in the area of the contact openings 32. However, this is irrelevant for the function of the edge 39, which is used as a seating for a framelike insulating element 4, which is inserted into the holding frame 30. In the case of two holding frames 30 that are stacked one on top of another, the insulating element 4 is arranged between each pair of stacked electrodes 3 that are arranged in the holding frame 30. A single spark gap of a stack spark gap is then formed by two electrodes 3 that are arranged one behind another and the insulating element 4 that is arranged between the electrodes 3.

Both in the holding frame 30 and in the insulating element 4, recesses 11 are formed for creating the connecting elements 9.

FIG. 5 shows multiple holding frames 30 that are stacked one on top of another and with electrodes 3 and insulating elements 4, which frames are clamped between the first clamping element 6 and the second clamping element 7. The contact openings 32, through which the electrodes 3 of the stack spark gaps 2 are contacted, are readily visible. The ignition switch 5 is plugged into the plugs 26 of the clamping elements 6, 7; the contacts 22 then extend through the contact openings 32. The gripping surfaces 37 made on the front sides 36 of the holding frame 30 form a larger overall gripping surface. In each case, the insulating elements 16, 17 are arranged between the clamping elements 6, 7 and the adjoining holding frame 30. Altogether, the clamping elements 6, 7 are connected to one another by four connecting elements 9, whereby only the lower two connecting elements 9 are also guided through recesses 11 into the holding frame 30. The upper two connecting elements 9 are only guided through recesses 11 into the clamping elements 6, 7 and the insulating elements 16, 17. To this end, both the clamping elements 6, 7 and the insulating elements 16, 17 have projections 40 that project beyond the holding frame 30, in which projections the recesses 11 are formed.

Figure 7:
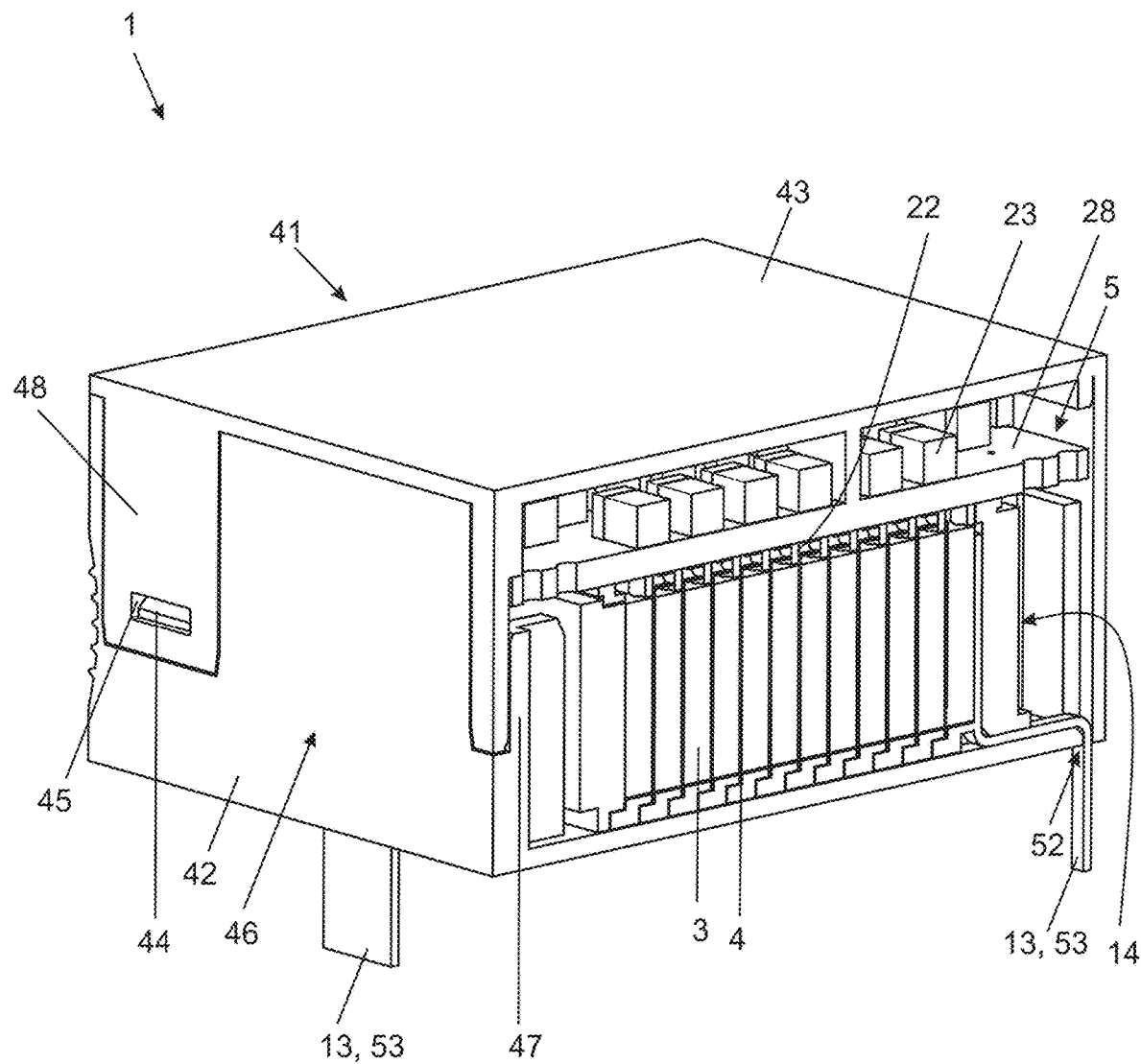
FIG. 7 shows a sectional view through the surge protection device.
Figure 8:
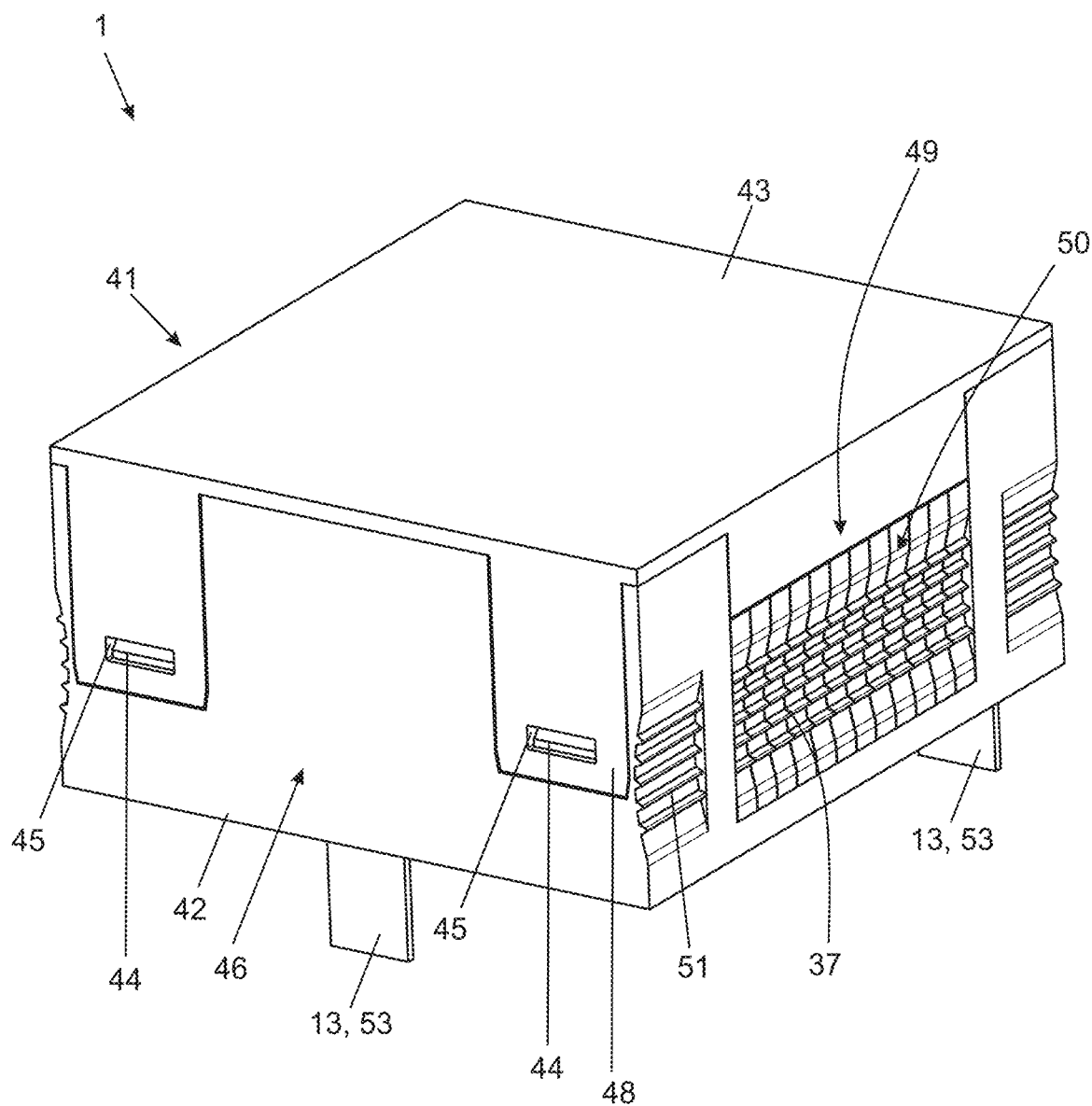
FIG. 8 shows a completely assembled surge protection device.

As can be seen in FIGS. 1, 6, 7, and 8, the surge protection device 1 has a housing 41, whereby the housing 41 is designed to have multiple parts including a housing bottom 42 and a housing cover 43. FIG. 6 shows the housing bottom 42 that is equipped with the elements of the surge protection device 1, FIG. 7 shows a sectional view of the equipped housing 41, and FIG. 8 shows the entire surge protection device 1 in the completely assembled state.

The housing 41 is designed box-shaped as a whole. In order to connect the housing bottom 42 and the housing cover 43 to one another, latching catches 44 are made on the housing bottom 42. Latching recesses 45 that correspond to the latching catches 44 are made in the housing cover 43, in which recesses the latching catches 44 engage in the connected state. The housing cover 43 is thus latched onto the housing bottom 42.

The latching catches 44 are made on the sides 46 of the housing bottom 42. The housing bottom 42 preferably has offsets 47 made on the exteriors of the sides 46, whereby the latching catches 44 then are made on the offsets 47. Straps 48 that correspond to the offsets 47 of the housing bottom 42 are made on the housing cover 43, in which straps the latching recesses 45 are made. The wall thickness of the straps 48 corresponds to the size of the offset 47, as is evident in the sectional view in FIG. 7, so that housing bottom 42 and housing cover 43 in the assembled state form as a whole an outwardly flat housing wall on the sides. The housing bottom 42 and housing cover 43 are further designed in such a way that in the assembled state, a respective recess 50 is formed on the ends 49 that are different from the sides 46. As can be seen in FIGS. 6 and 8, the recesses 50 are designed in such a way that the gripping surfaces 37 of the holding frame 30 that is positioned in the housing 41 are arranged in the recesses 50. In this way, a structurally elegant solution arises in order to be able to use the gripping surfaces 37 of the holding frame 30 as a gripping surface for the entire surge protection device 1. In addition to the gripping surfaces 37 that are formed by the holding frame 30, still other gripping surfaces 51 are made on the housing bottom 42. An especially simple removal of the holding frame 30 from the housing 41 is made possible by these gripping surfaces 51.

In order to be able to easily contact the surge protection device 1 in the completely assembled state, connection openings 52 (FIG. 7 on the right) are made in the housing bottom 42. The connection elements 13 of the stack spark gaps 2 project at least partially from the housing 42 through the connection openings 52, in particular with a connection area 53 of the connection elements 13. The connection openings 52 are preferably made in the bottom of the housing bottom 42.

The invention claimed is:

1. A surge protection device, comprising:
a plurality of stack spark gaps, each stack spark gap being formed from multiple electrodes and insulating elements that are arranged between the electrodes,
an ignition circuit for influencing the ignition behavior of the stack spark gaps,
a first electrically conductive clamping element and a second electrically conductive clamping element, the clamping elements being arranged opposite to one another at the front sides of the stack spark gaps,
at least one connecting element by which the clamping elements are connected to one another, and
connection elements for electrical connection of the stack spark gaps,
wherein three stack spark gaps are arranged beside one another between the two clamping elements,
wherein the at least one connecting element is electrically conductive, and the two clamping elements are connected electrically to one another via the connecting element,
wherein each stack spark gap is connected on a first end that is used as a connection end in an electrically conductive manner to one of the connection elements,
wherein an insulator is arranged between each the clamping element and the connection side of an adjacent one of stack spark gaps, so that the connection side of the adjacent stack spark gap is insulated electrically from the clamping element,
wherein a second end of each stack spark gap that is opposite the first end is connected in an electrically conductive manner to one of the clamping elements in such a way that the three stack spark gaps form a star circuit, and wherein the ignition circuit is pluggable onto at least one of the clamping elements so as to be held in a defined manner opposed to the at least one of the clamping elements and the stack spark gaps.

2. The surge protection device according to claim 1, wherein, in a plugged-on state, the ignition circuit makes electrical contact with the at least one of the clamping elements.

3. The surge protection device according to claim 1, wherein the ignition circuit, in the plugged-on state, makes contact with at least one electrode via a contact of the ignition circuit.

4. The surge protection device according to claim 3, wherein each electrode of a stack spark gap is contacted except for a first electrode on the first end of each stack spark gap.

5. The surge protection device according to claim 4, wherein the ignition circuit comprises capacitors, a respective capacitor being connected with one terminal to a respective electrode of the stack spark gap and wherein the other terminals of the capacitors are connected to one another in an electrically conductive manner.

6. The surge protection device according to claim 1, wherein a plug is made on at least one clamping element, which plug extends into at least one corresponding recess in the ignition circuit, the recess being in a plate of the ignition circuit.

7. The surge protection device according to claim 1, wherein the electrodes of the stack spark gaps are arranged in holding frames that can be stacked flat one on top of another, whereby the individual holding frames have recesses for respectively accommodating one of the electrodes per recess.

8. The surge protection device according to claim 7, wherein, in the individual holding frames, a number of contact openings that corresponds to the number of recesses are formed, whereby, each of the contact openings is connected to a respective one of the recesses, so that the electrodes arranged in the recesses can be contacted by the ignition circuit through the contact openings.

9. The surge protection device according to claim 7, wherein gripping surfaces are made on the opposite ends of the holding frames.

10. The surge protection device according to claim 1, wherein the stack spark gaps are arranged in a housing comprised of at least a housing bottom and a housing cover.

11. The surge protection device according to claim 10, wherein latching catches are provided on the housing bottom, the catches engaging in corresponding latching recesses on the housing cover, so that the housing cover can be latched onto the housing bottom.

12. The surge protection device according to claim 9, wherein the electrodes of the stack spark gaps are arranged in the holding frames and wherein the gripping surfaces are accessible via recesses formed on opposite sides of the housing.

13. The surge protection device according to claim 9, wherein connection openings are made in the housing bottom and in that the connection elements of the stack spark gaps have connection areas which extend at least partially through the connection openings from the housing.

* * * * *